Patented Apr. 21, 1931

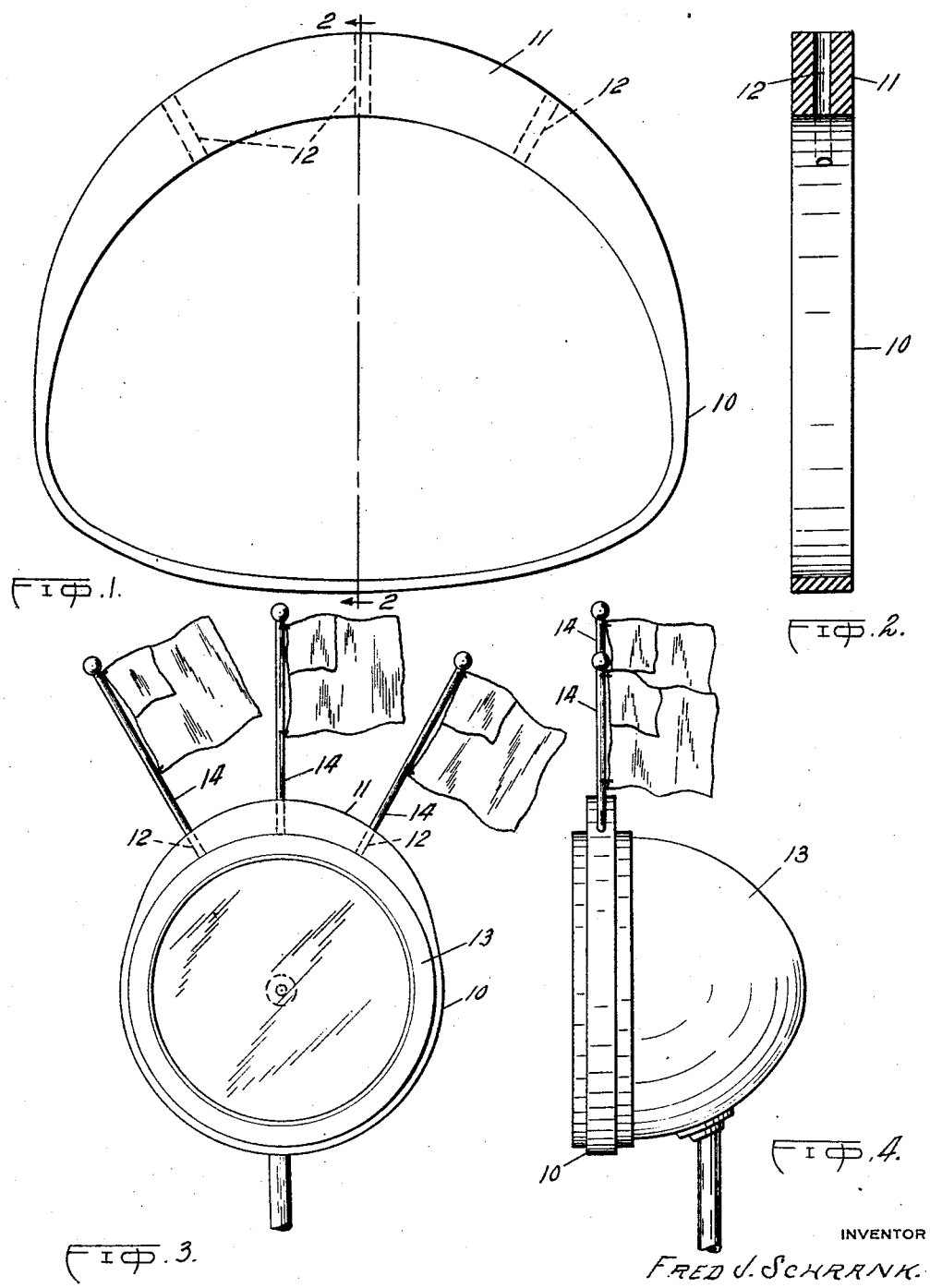

1,802,159

UNITED STATES PATENT OFFICE

FRED J. SCHRANK, OF AKRON, OHIO

ARTICLE HOLDER

Application filed October 3, 1930. Serial No. 486,206.

This invention relates to article holders and particularly to holders for mounting articles such as flags upon objects such as lamps for vehicles.

The general purpose of the invention is to provide a simple, effective holder comprising an elastic band adapted to be expanded and snapped about a vehicle lamp or the like and provided with means for retaining an article or articles such as flags, shields, etc. thereon.

More particularly the invention has for its object the provision of a band of rubber adapted to be expanded and snapped onto a vehicle lamp or the like and having an enlarged portion in which are one or more sockets for receiving an article such as the stem of a flag.

The foregoing and other purposes or objects of the invention are attained in the flag holder shown in the accompanying drawings and described below. It is to be understood that the invention is not limited to the specific form thereof shown and described.

Of the accompanying drawings,

Figure 1 is an elevation of a flag holder embodying the invention;

Figure 2 is a section on line 2—2 of Figure 1;

Figure 3 is a front elevation of a vehicle lamp having the improved flag holder mounted thereon; and Figure 4 is a side elevation thereof.

Referring to the drawings, the numeral 10 designates a band of elastic rubber which is preferably thickened as at 11 and formed with one or more sockets 12, 12 adapted to receive flag stems or other supports for articles to be mounted on the holder.

The band 10 is made normally of smaller diameter than the lamps or other objects on which they are to be mounted and are mounted on these objects as, for example, on the rim of a lamp 13 by expanding over said rim and snapping it into place. The sockets 12 are preferably of smaller diameter than the supports for the articles to be mounted such as the flag staffs 14 so that these are gripped by the rubber walls of the sockets and thus retained in place without the use of extraneous fastening means. The sockets are formed through the band, as shown, or they may be extended only part way, if desired.

It is apparent that the improved holder is not limited to use for supporting flags on vehicle lamps, but may be employed where various articles may be similarly mounted on various objects. Moreover, modifications of the construction thereof may be resorted to without departing from the spirit of the invention or the scope of the appended claims.

What is claimed is:—

1. A flag holder for vehicles comprising an elastic rubber band formed with a thickened portion containing one or more sockets to receive flag stems, said band being adapted to be expanded over and snapped in place on a vehicle lamp to be retained thereon by its inherent elasticity, said sockets being smaller in diameter than the flag stems whereby the latter are retained therein by the gripping action of the rubber walls of the sockets.

2. An article holder for mounting articles upon an object comprising an elastic rubber band adapted to be expanded over the object to be retained thereon by its inherent resilience, said band being provided with a portion of rubber thereon which is provided with one or more sockets in which the articles may be engaged, said sockets being normally smaller in diameter than the portions of the articles to be engaged therein.

FRED J. SCHRANK.